United States Patent
Whitmarsh et al.

(10) Patent No.: US 10,656,624 B2
(45) Date of Patent: May 19, 2020

(54) IDENTIFY A MODEL THAT MATCHES A 3D OBJECT

(71) Applicant: Hewlett-Packard Development Company, L.P., Houston, TX (US)

(72) Inventors: Mike Whitmarsh, Vancouver, WA (US); William E. Hertling, Portland, OR (US); Arjun Angur Patel, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 15/767,068

(22) PCT Filed: Jan. 29, 2016

(86) PCT No.: PCT/US2016/015774
§ 371 (c)(1),
(2) Date: Apr. 9, 2018

(87) PCT Pub. No.: WO2017/131771
PCT Pub. Date: Aug. 3, 2017

(65) Prior Publication Data
US 2018/0321658 A1    Nov. 8, 2018

(51) Int. Cl.
*B33Y 50/00*    (2015.01)
*G06F 16/532*    (2019.01)
(Continued)

(52) U.S. Cl.
CPC .......... *G05B 19/4099* (2013.01); *B33Y 50/00* (2014.12); *G06F 16/532* (2019.01);
(Continued)

(58) Field of Classification Search
CPC ....... B33Y 50/00; G06F 16/532; G06T 17/00; G06T 19/00
See application file for complete search history.

(56) References Cited

U.S. PATENT DOCUMENTS 8,429,174 B2    4/2013    Ramani et al.
8,447,098 B1    5/2013    Cohen et al.
(Continued)

FOREIGN PATENT DOCUMENTS

WO    WO-2012061945    5/2012
WO    WO-2014191055    12/2014
WO    WO-2015008012    1/2015

OTHER PUBLICATIONS

Yangyan Li, et al., "Database-assisted Object Retrieval for Real-time 3d Reconstruction", Dec. 29, 2014, 12 pages. http://graphics.stanford.edu/projects/objectsensing/ObjectSensing-small.pdf.
(Continued)

*Primary Examiner* — Ronald D Hartman, Jr.
(74) *Attorney, Agent, or Firm* — Mannava & Kang

(57) ABSTRACT

According to an example, an apparatus may include a hardware processor that is to access a first scanned image, in which the first scanned image corresponds to a scanned first feature of a three-dimensional (3D) object, perform a search for models matching the 3D object based upon the first scanned image, identify, from the search, a first set of candidate models, identify, from the first set of candidate models, a general identity of the 3D object, determine, based upon the identified general identity of the 3D object, a second feature of the 3D object that is to be scanned, and output an instruction to obtain a second scanned image of the determined second feature of the 3D object.

16 Claims, 5 Drawing Sheets

(51) Int. Cl.
*G06T 17/00* (2006.01)
*G06T 19/00* (2011.01)
*G05B 19/4099* (2006.01)

(52) U.S. Cl.
CPC .............. *G06T 17/00* (2013.01); *G06T 19/00* (2013.01); *G05B 2219/35134* (2013.01); *G05B 2219/49007* (2013.01); *G06T 2200/08* (2013.01)

(56) References Cited

U.S. PATENT DOCUMENTS

| | | | |
|---|---|---|---|
| 8,606,774 | B1 | 12/2013 | Makadia et al. |
| 8,848,201 | B1* | 9/2014 | Bruce .................. G01B 21/047 356/601 |
| 8,976,179 | B2 | 3/2015 | Kuffner et al. |
| 10,311,634 | B2* | 6/2019 | Houghton ............ G06Q 10/087 |
| 10,410,043 | B2* | 9/2019 | Meany ................ G06K 9/00214 |
| 2012/0092724 | A1* | 4/2012 | Pettis .................... B29C 64/386 358/1.15 |
| 2013/0162643 | A1 | 6/2013 | Cardle |
| 2014/0371895 | A1* | 12/2014 | Sadusk .................. B33Y 10/00 700/98 |
| 2015/0009214 | A1* | 1/2015 | Lee ........................ G06T 17/10 345/420 |
| 2015/0186418 | A1 | 7/2015 | Harp et al. |
| 2015/0201104 | A1 | 7/2015 | Rathod et al. |
| 2015/0205544 | A1* | 7/2015 | Webb ................ H04N 1/32539 358/1.15 |
| 2015/0332512 | A1 | 11/2015 | Siddiqui et al. |
| 2016/0048609 | A1* | 2/2016 | Voris ........................ G06F 17/50 700/98 |
| 2016/0067927 | A1* | 3/2016 | Voris ........................ B33Y 50/02 700/98 |
| 2016/0096318 | A1* | 4/2016 | Bickel ................ B29C 67/0051 264/40.1 |
| 2016/0150213 | A1* | 5/2016 | Mutti ...................... G01N 33/02 348/143 |
| 2016/0229120 | A1* | 8/2016 | Levine .................. B29C 64/386 |
| 2017/0124223 | A1* | 5/2017 | Maeda .................... G06F 17/50 |
| 2017/0161960 | A1* | 6/2017 | High ...................... B33Y 10/00 |
| 2017/0206702 | A1* | 7/2017 | Choi ....................... G06T 5/002 |
| 2017/0308977 | A1* | 10/2017 | Li .......................... B29C 64/386 |
| 2017/0336777 | A1* | 11/2017 | Koh .................... G05B 19/4099 |
| 2017/0372127 | A1* | 12/2017 | Meany ............... G06K 9/00214 |
| 2018/0104898 | A1* | 4/2018 | Lameris .................. B29C 64/20 |
| 2018/0299869 | A1* | 10/2018 | Yukumoto ............. G06F 17/50 |
| 2018/0321658 | A1* | 11/2018 | Whitmarsh .............. B33Y 50/00 |
| 2019/0122424 | A1* | 4/2019 | Moore .................... G06T 17/00 |

OTHER PUBLICATIONS

Mark Pauly, et al., "Example-Based 3D Scan Completion", May 30, 2005, 10 pages. http://infoscience.epfl.ch/record/149337/files/pauly_2005_EBS.pdf.

International Search Report and Written Opinion dated Oct. 28, 2016, PCT Patent Application No. PCT/US2016/015774, filed Jan. 29, 2016, Korean Intellectual Property Office.

* cited by examiner

IDENTIFY A MODEL THAT MATCHES A 3D OBJECT

CLAIM FOR PRIORITY

The present application is a national stage filing under 35 U.S.C. § 371 of PCT application number PCT/US2016/015774, having an international filing date of Jan. 29, 2016, the disclosure of which is hereby incorporated by reference in its entirety.

BACKGROUND

Three-dimensional (3D) printers may be used to replicate 3D objects. For example, scanned images of nearly every angle of an original 3D object may be captured and used to generate a high quality digital representation of the 3D object. A 3D printer may use a descriptive data file built from the high quality digital representation to print a replicated version of the original 3D object.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means includes but not limited to, the term "including" means including but not limited to, and the term "based on" means based at least in part on.

Disclosed herein are apparatuses and methods for identifying a model that matches a three-dimensional (3D) object. As discussed herein, the model may be used to fabricate or 3D print a replicated version of the 3D object. As also discussed herein, the model, which may be a high resolution digital model of the 3D object, may be used to generate a print data file for a 3D printer to use in printing the replicated version of the 3D object. In addition, or alternatively, the high resolution digital model of the 3D object may be used as a basis for further digital design and modification of a 3D object, which may later be 3D printed or otherwise fabricated.

In one regard, through implementation of the apparatuses and methods disclosed herein, a high resolution digital model of the 3D object may be obtained without requiring that high resolution images of the entire 3D object be captured. Instead, a relatively low or medium resolution image of a portion the 3D object may be used to search for the matching model, which may result in significant savings in time, computational expense, data transfer fees, and bandwidth. In addition, the search for the matching model may be augmented with additional scanned images and/or additional information pertaining to the 3D object.

Figure 1A:
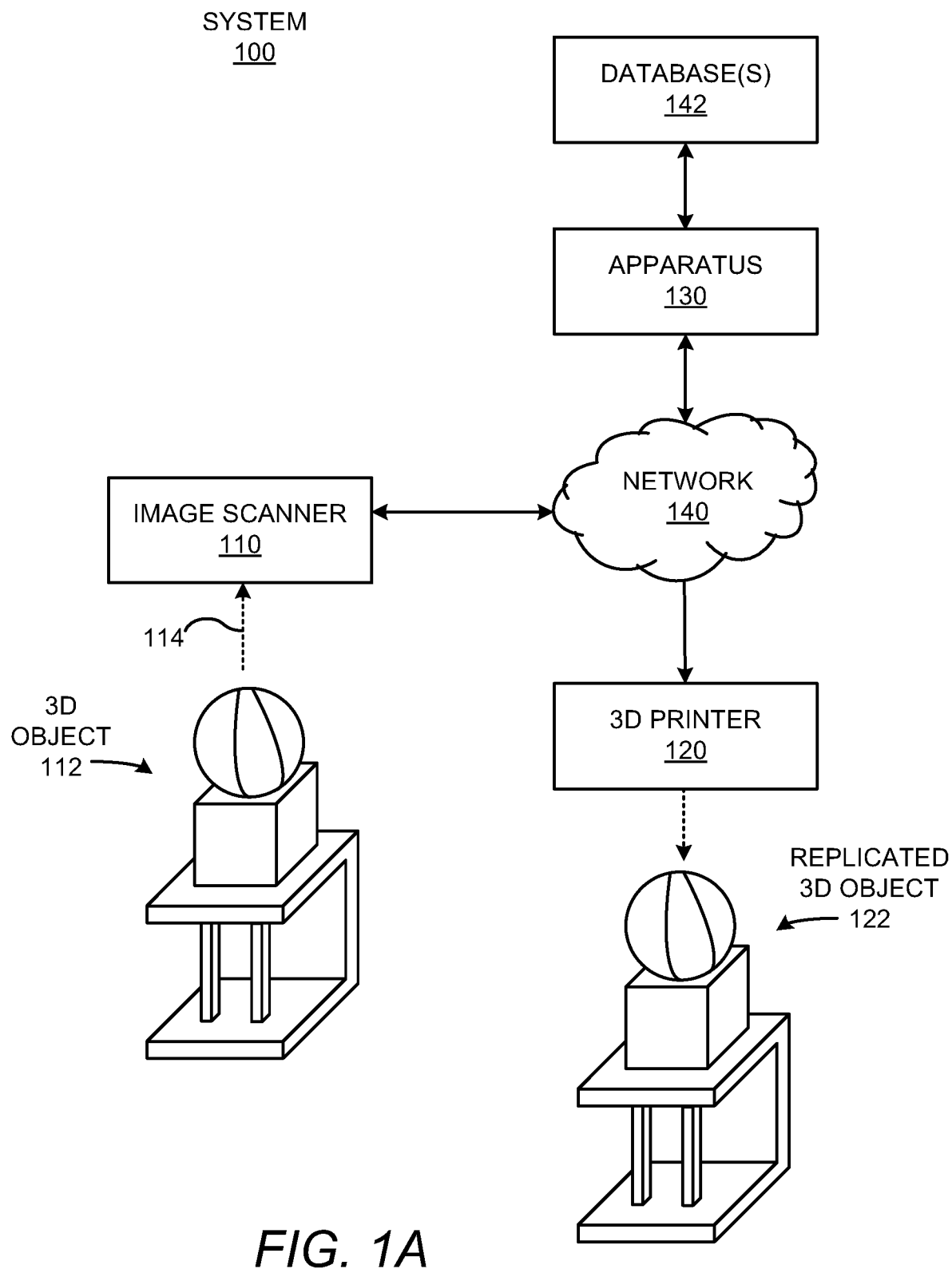
FIGS. 1A and 1B, respectively, show simplified diagrams of example systems in which an example apparatus may be implemented.
Figure 1B:
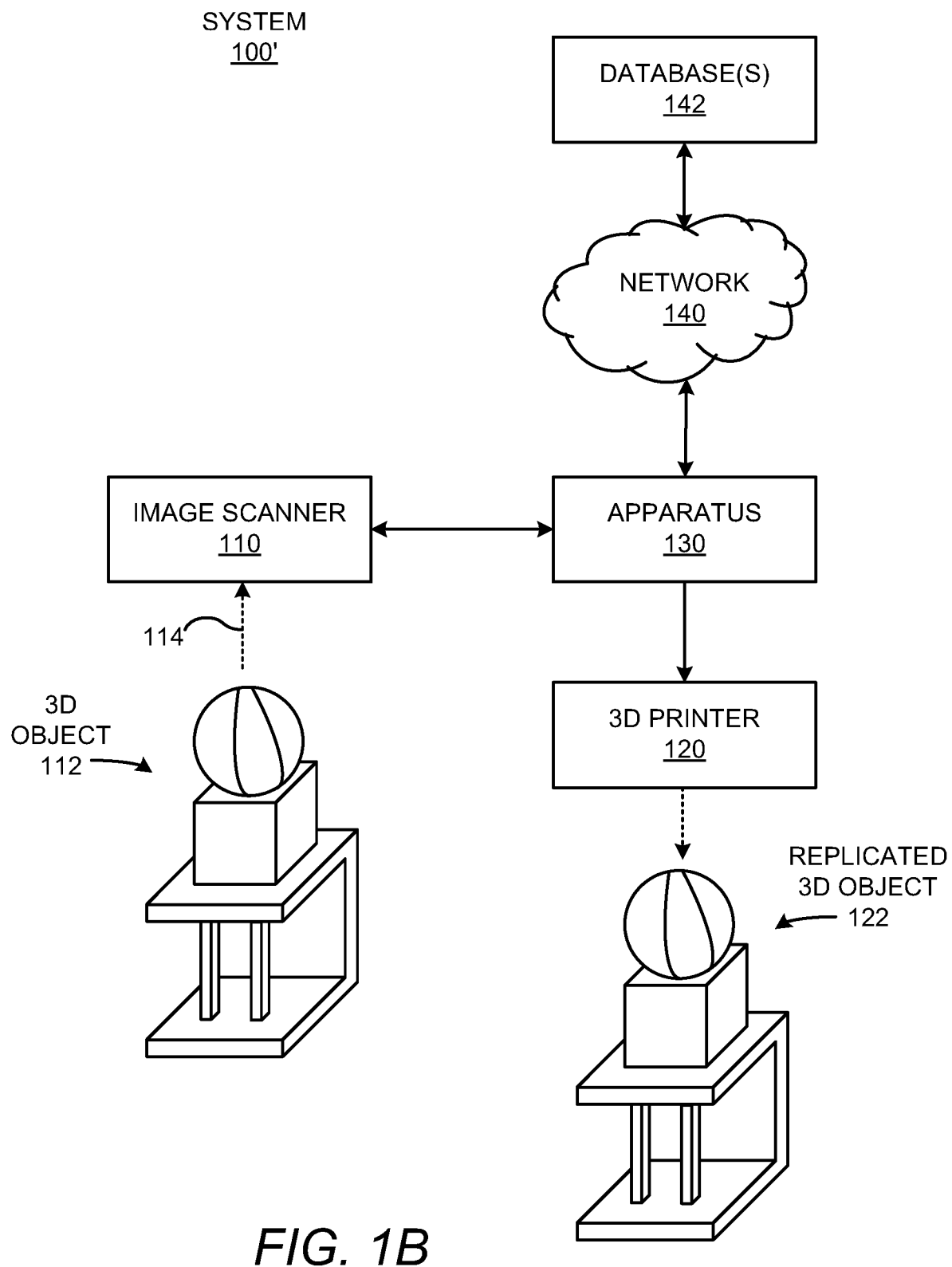

With reference first to FIGS. 1A and 1B, there are respectively shown simplified diagrams of example systems 100 and 100' within which an example apparatus 130 may implemented. It should be understood that the example systems 100, 100' depicted in FIGS. 1A and 1B may include additional components and that some of the components described herein may be removed and/or modified without departing from the scopes of the systems 100, 100'.

Each of the systems 100, 100' is depicted as including an image scanner 110 and a 3D printer 120. The image scanner 110 and the 3D printer 120 may be separate components or the image scanner 110 and the 3D printer 120 may form part of the same component. In any regard, the image scanner 110 may include a camera and other optical components (not shown) for capturing images of 3D objects, as denoted by the arrow 114. In addition, the image scanner 110 may be movable around the 3D object 112 such that the image scanner 110 may capture images of various different areas of the 3D object 112. A simple example of a 3D object 112 is also depicted in FIGS. 1A and 1B. The 3D object 112 may be an object that is to be used as a basis for digital design and modification of a digital representation of the 3D object. Additionally, the 3D printer 120 may use a high resolution digital model of the 3D object or the digital design to build a replicated version of the 3D object 122.

In order for the 3D printer 120 to print the replicated 3D object 122, the 3D printer 120 may use a descriptive data file that describes, for instance, the various features of the 3D object. That is, the 3D printer 120 may use the descriptive data file to control its operation in building the replicated 3D object 122. In one example, the 3D printer 120 may include instructions for converting the descriptive data file into printing instructions for the 3D printer 120 in printing the replicated 3D object 122. By way of particular example in which the 3D printer 120 is an additive inkjet type 3D printer, the descriptive data file may be converted into instructions for the 3D printer 120 to control placement of a fusing agent on each of the layers formed to build the replicated 3D object 122.

The descriptive data file may be created through capture of, by the image scanner 110, a plurality of high resolution images taken at a number of different views with respect to the 3D object 112 and by processing the plurality of images to develop a digital representation of the 3D object 112. However, capturing of a sufficient number of high resolution images of different sections of the 3D object 112 to develop a high resolution digital representation of the 3D object 112 may consume a great deal of time and expense, e.g., in terms of computational costs. Additionally, the high resolution images often fail to include images of the interior features of the 3D object 112 and thus, interior structural features may be omitted from the digital representation. As such, generation of a digital representation that may be used to generate an accurate descriptive data file of the 3D object 112 may not be possible or may be relatively difficult.

According to an example, the systems 100, 100' may include an apparatus 130 that may substantially reduce the time and expense involved in obtaining a high resolution digital representation of a 3D object 112 as well as in replicating the 3D object 112 with a 3D printer 120. Particularly, instead of generating a digital representation of the 3D object 112 from a complete or a nearly complete set of high resolution images, the apparatus 130 may search for and access a high resolution digital model of the 3D object 112 from a scan of a partial section of the 3D object 112. That is, the apparatus 130 may use a scanned portion or a plurality of scanned portions of the 3D object 112 to identify a high resolution digital model that matches the 3D object 112. In one regard, therefore, the apparatus 130 may obtain a high resolution digital model of the 3D object 112 without requiring that high resolution images of the entire 3D object 112 be obtained and processed into a digital representation of the 3D object 112. In one example, the high resolution digital model may be used as a basis for modification of the design or features of the 3D object 112. In addition or alternatively, the high resolution digital model may be used to develop the descriptive data file of the 3D object 112 for use in the printing of a replicated version of the 3D object 122. Moreover, the high resolution digital model may be a 3D model and may include information pertaining to both the exterior and the interior of the 3D object 112.

As shown in FIGS. 1A and 1B, the apparatus 130 may access a database 142 or a plurality of databases 142 to search for information contained in the database(s) 142. The database(s) 142 may include models for a plurality of 3D objects, which may have been developed, for instance, by the manufacturers of the 3D objects, users who have previously scanned full versions of the 3D objects and have uploaded digital representations of the 3D objects, etc. By way of example, the network 140 may be the Internet and the database(s) 142 may be accessible via a website or websites. In another example, the network 140 may be an Intranet, a Wide Area Network, etc., and the database(s) 142 may be locally accessible database(s).

As shown in FIG. 1A, the image scanner 110 may communicate with, e.g., send scanned images to, the apparatus 130 through the network 140 and the apparatus 130 may also communicate instructions or other information back to the image scanner 110 and/or the 3D printer 120 through the network 140. In this regard, the apparatus 130 may be considered as being in the "cloud" and the image scanner 110 and/or the 3D printer 120 may communicate with the apparatus 130 via the "cloud." In the example system 100 depicted in FIG. 1A, therefore, the apparatus 130 may directly access the information contained in the database(s) 142, i.e., without traversing a network 140, and thus, a relatively smaller amount of data may be communicated over the network 140. The example system 100 may thus enable for a relatively fast determination of the 3D object 112 and a model that matches the 3D object 112 as data pertaining to a number of models need not be communicated over the network 140. Instead, the apparatus 130 may communicate a model that matches or a relatively small number of models that match the 3D object 112 back to the scanner 110, the 3D printer 120, or to a user's computing device (not shown).

In contrast, in FIG. 1B, the image scanner 110 and the 3D printer 120 are depicted as communicating directly with the apparatus 130, i.e., not via the network 140. In FIG. 1B, therefore, the apparatus 130 may access the information contained in the database(s) 142 via the network 140, which may involve the communication of a greater amount of data across the network 140 as compared with the system 100 depicted in FIG. 1A. Additionally, although the image scanner 110, the 3D printer 120, and the apparatus 130 have been depicted as being separate components in FIG. 1B, it should be understood that the image scanner 110, the 3D printer 120, and the apparatus 130 may all be part of a common device. Thus, for instance, the apparatus 130 may control the image scanner 110 to capture images of various sections or features of the 3D object 112. For instance, the apparatus 130 may control the image scanner 110 to move to different locations with respect to the 3D object 112 and to capture images of the different locations. In addition, or alternatively, the apparatus 130 may control the 3D printer 120 to build the replicated 3D object 122 using one of a set of candidate models that corresponds to the 3D object 112.

According to an example, either or both of the systems 100, 100' may include a plurality of apparatuses 130. In this example, each the plural apparatuses 130 may operate in parallel, i.e., use parallel processing techniques such as map-reduce, message parsing, and functional decomposition (e.g., where one or more machines analyze an image to reduce it to a simpler set of characteristics, while a different set of apparatuses 130 searches the database(s) 142 for models matching the characteristics. In this regard, the use of multiple apparatuses 130 may reduce the amount of time required to determine the search characteristics of accessed images and to identify models that match the search characteristics as compared with the use a single apparatus 130. In addition, in this example, the plural apparatuses 130 may be networked to each other.

Various manners in which the apparatus 130 or apparatuses 130 may be implemented are described in greater detail below with respect to FIGS. 2-4.

Figure 2:
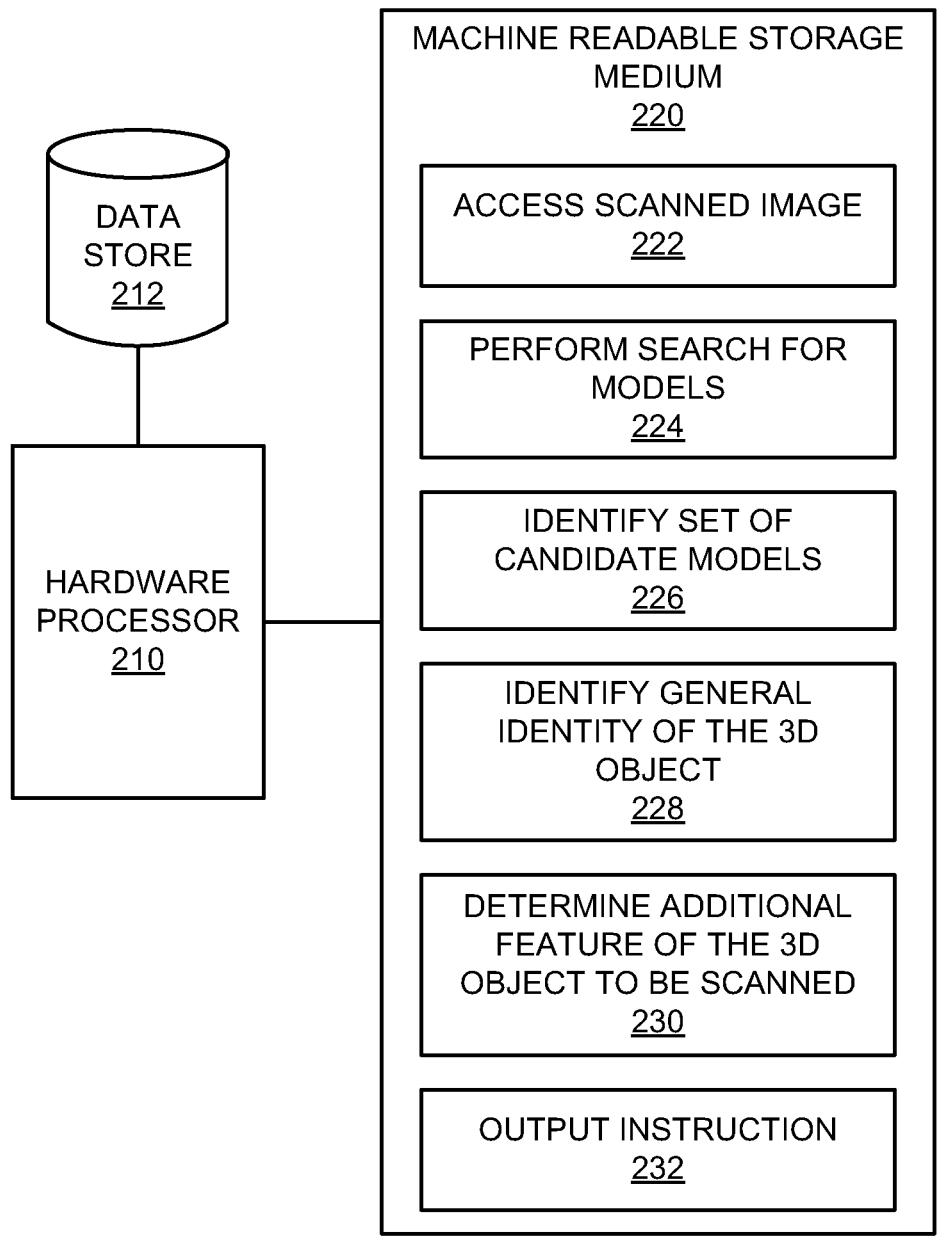
FIG. 2 shows a simplified block diagram of the example apparatus depicted in FIGS. 1A and 1B, and FIGS. 3 and 4, respectively, depict example methods for identifying a model that matches a 3D object.

With reference first to FIG. 2, there is shown a simplified block diagram of the example apparatus 130 depicted in FIGS. 1A and 1B. In one example, the apparatus 130 is a computing device, e.g., a personal computer, a laptop computer, a server computer, a smartphone, a table computer, or the like. In another example, the apparatus 130 forms part of either or both the image scanner 110 and the 3D printer 120 depicted in FIG. 1B. For instance, the apparatus 130 may be a command module or other control system of the image scanner 110 and/or the 3D printer 120. It should be understood that the apparatus 130 depicted in FIG. 2 may include additional components and that some of the components described herein may be removed and/or modified without departing from a scope of the apparatus 130.

The apparatus 130 is shown in FIG. 2 as including a hardware processor 210 and a data store 212. The hardware processor 210 may be a semiconductor-based microprocessor, a central processing unit (CPU), an application specific integrated circuit (ASIC), and/or other hardware device. The data store 212 may store, for instance, scanned images or data corresponding to the scanned images received from the image scanner 110. As used herein, "scanned images" should be understood as corresponding to the actual scanned images or data corresponding to (e.g., describing) the scanned images. The data store 212 may also store sets of candidate models identified during searches performed on the database(s) 142. The data store 212 may be a Random Access Memory (RAM), an Electrically Erasable Programmable Read-Only Memory (EEPROM), a storage device, an optical disc, or the like.

The apparatus 130 is also depicted as including a machine readable storage medium 220 on which is stored machine readable instructions 222-232 that the hardware processor 210 may execute. More particularly, the hardware processor 210 may fetch, decode, and execute the instructions to access a scanned image 222, perform a search for models 224 of a 3D object 112, identify a set of candidate models 226 from the performed search, identify a general identity of the 3D object 228, determine an additional feature of the 3D object 112 to be scanned 230, and output an instruction to obtain an image of the additional feature 232. As an alternative or in addition to retrieving and executing instructions, the hardware processor 210 may include one or more electronic circuits that include electronic components for performing the functionalities of the instructions 222-232. In any regard, the hardware processor 210 may communicate instruction signals to either or both of the image scanner 110 and the 3D printer 120.

The machine-readable storage medium 220 may be any electronic, magnetic, optical, or other physical storage device that contains or stores executable instructions. Thus, the machine-readable storage medium 220 may be, for example, Random Access Memory (RAM), an Electrically Erasable Programmable Read-Only Memory (EEPROM), a storage device, an optical disc, and the like. The machine-readable storage medium 220 may be a non-transitory machine-readable storage medium, where the term "non-transitory" does not encompass transitory propagating signals.

According to an example, the apparatus 130 may include a plurality of hardware processors 210 and/or a hardware processor 210 containing a plurality of cores. In these examples, each the plural hardware processors 210 and/or cores may operate in parallel, i.e., use parallel processing techniques such as map-reduce, message parsing, and functional decomposition (e.g., where one or more hardware processors 210 and/or cores analyze an image to reduce it to a simpler set of characteristics, while a different set of hardware processors 210 and/or cores searches the database(s) 142 for models matching the characteristics. In this regard, the use of multiple hardware processors 210 and/or cores may reduce the amount of time required to determine the search characteristics of accessed images and to identify models that match the search characteristics as compared with the use a single hardware processor 210.

Figure 3:
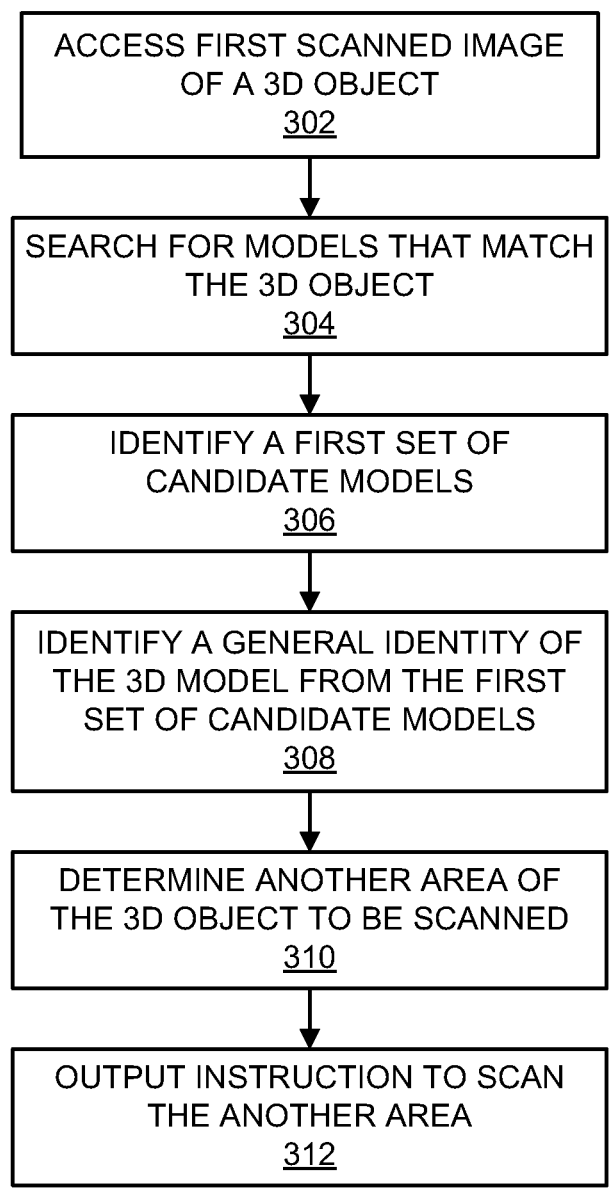
Figure 4:
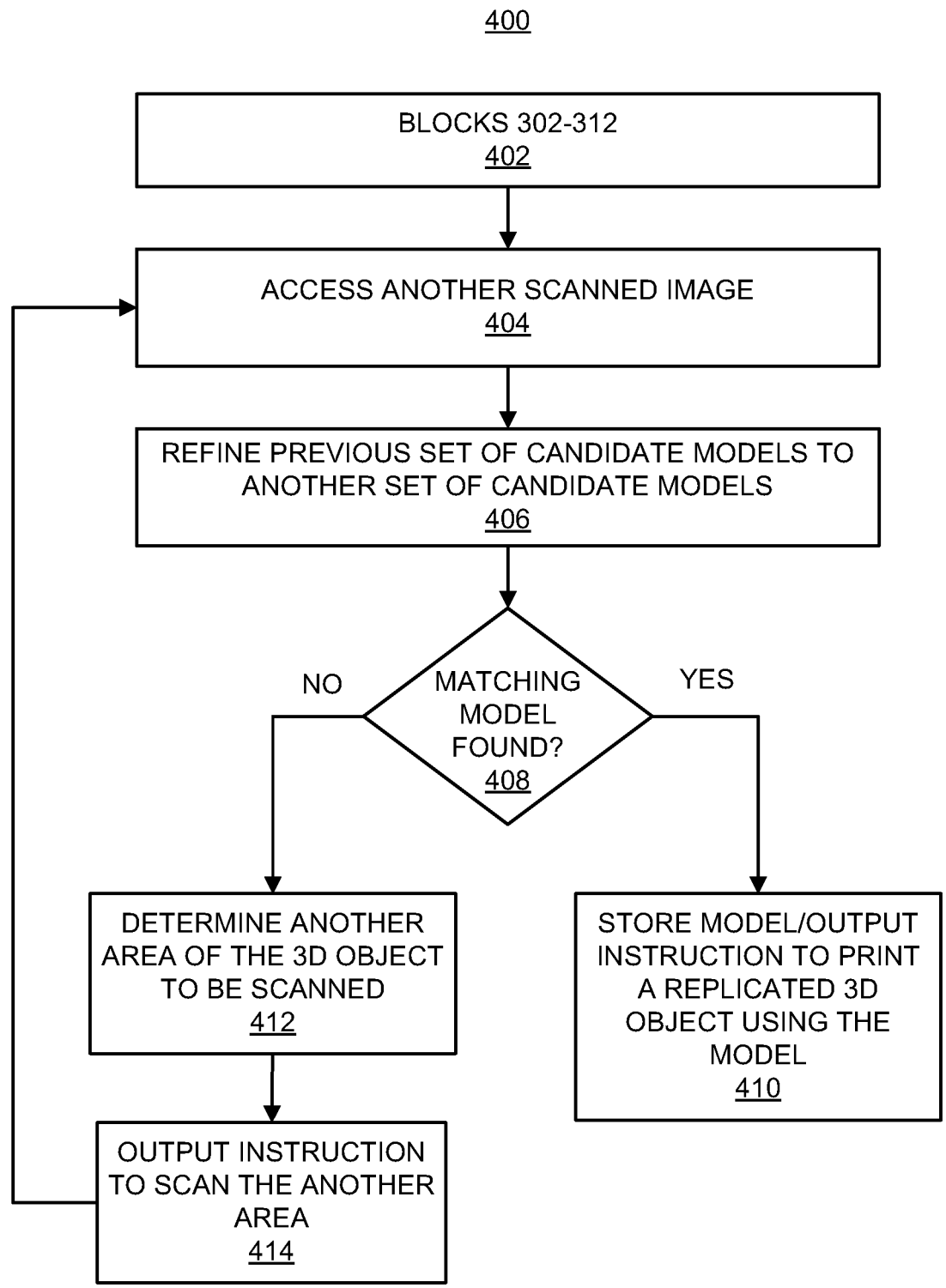

Turning now to FIGS. 3 and 4, there are shown example methods 300 and 400 for identifying a model that matches a 3D object. It should be apparent to those of ordinary skill in the art that the methods 300 and 400 may represent generalized illustrations and that other operations may be added or existing operations may be removed, modified, or rearranged without departing from the scopes of the methods 300 and 400.

The descriptions of the methods 300 and 400 are made with reference to the apparatus 130 illustrated in FIGS. 1 and 2 for purposes of illustration. It should, however, be clearly understood that apparatuses having other configurations may be implemented to perform either or both of the methods 300 and 400 without departing from the scopes of the methods 300 and 400.

With reference first to FIG. 3, at block 302, a first scanned image from the image scanner 110 may be accessed. For instance, the hardware processor(s) 210 may execute the instructions 222 to access the first scanned image from the image scanner 210. In addition, or alternatively, the first scanned image may have been stored in the data store 212 and the hardware processor 210 may access the first scanned image from the data store 212. In any regard, the first scanned image may correspond to a first area (or equivalently, feature, location, surface, or the like), of the 3D object 112. That is, the first scanned image may be an image of a portion of the 3D object 112 and not multiple images of the 3D object 112. By way of example, the first scanned image may be of one side of the top-most portion of the 3D object 112.

At block 304, a search for models that match the 3D object may be performed. For instance, the hardware processor(s) 210 and/or core(s) may execute the instructions 224 to perform the search for matching models. Particularly, for instance, a hardware processor 210 may build a coarse descriptive data file corresponding to the first scanned image and may employ a search engine to search for models, e.g., matching 3D design files, that match the 3D object 112 using the coarse descriptive data file. By way of example, the hardware processor 210 may execute a search over the Internet to identify matching models that are stored on the database(s) 142. As discussed above, one of a plurality of hardware processors 210 (and/or cores) may build the coarse descriptive data file of the first scanned image while another one of the plurality of hardware processors 210 (and/or cores) performs the search for the matching models, to thus implement a parallel processing technique. In addition, or alternatively, one of the plurality of hardware processors 210 (and/or cores) may perform a search on one of the databases 142 while another one of the plurality of hardware processors 210 (and/or cores) performs a search on another one of the databases 142.

At block 306, a first set of candidate models that matches the coarse descriptive data file of the first scanned image may be identified. For instance, the hardware processor(s) 210 and/or core(s) may execute the instructions 226 to identify the first set of candidate models.

At block 308, a general identity of the 3D object may be identified from the identified first set of candidate models. For instance, the hardware processor(s) 210 and/or core(s) may execute the instructions 228 to identify the general identity of the 3D object 112. That is, the hardware processor(s) 210 and/or cores may determine that some or all of the first set of candidate models pertain to a particular type of object. For instance, the hardware processor(s) 210 and/or core(s) may determine that a majority of the models in the first set of candidate models pertain to trophies. In one regard, therefore, the general identity of the 3D object may include a class or type of the object, but may not include the exact identity of the object.

At block 310, another feature of the 3D object that is to be scanned may be determined based upon the identified general identity of the 3D object. For instance, the hardware processor(s) 210 and/or core(s) may execute the instructions 230 to determine that for the identified general identity of the 3D object, that a particular area of the 3D object provides a maximum distinction between the objects in a particular class of objects and is thus likely to result in an accurate identification of the 3D object and a matching model. By way of particular example, the hardware processor(s) and/or core(s) 210 may determine that, for trophies, the base of a trophy provides the maximum distinction.

The hardware processor(s) 210 and/or core(s) may access a database containing information that identifies which features of a plurality of different types of objects are more likely to result in accurate identifications of the objects in order to determine the another feature of the 3D object that is to be scanned.

At block 312, an instruction to obtain a second scanned image of the determined another feature of the 3D object may be outputted. For instance, the hardware processor(s) 210 and/or core(s) may execute the instructions 232 to output the instruction to a user via an interface, such as a display (not shown) on the apparatus 130, the image scanner 110, or a user's computing device (not shown). In another example, the hardware processor(s) 210 and/or core(s) may control the image scanner 110 to move to a particular location with respect to the 3D object 112 and to capture an image of the another feature on the 3D object 112.

Turning now to FIG. 4, at block 402, the hardware processor(s) 210 and/or core(s) may execute blocks 302-312. In other words, the method 400 may begin with the performance of the method 300.

At block 404, another scanned image may be accessed. For instance, the hardware processor(s) 210 and/or core(s) may execute the instructions 222 to access the another scanned image. As discussed above with respect to FIG. 3, the another scanned image may correspond to another area of the 3D object 112 that was determined as maximizing a distinction between the objects in a particular class of objects to which the 3D object 112 belongs.

At block 406, the first set of candidate models identified at block 306 may be searched to obtain a second set of candidate models based upon the another scanned image. That is, for instance, the hardware processor(s) 210 and/or core(s) may generate a coarse descriptive data file pertaining to the second scanned image and may perform a search on the first set of candidate models to determine whether the second scanned image matches any of those candidate models. At block 406, therefore, the hardware processor(s) 210 and/or core(s) may refine the first set of candidate models to a second set of candidate models, in which the second set of candidate models are more likely to match the 3D object 112.

According to an example, the hardware processor(s) 210 and/or core(s) may access additional data to further refine the set of candidate models at block 406. For instance, additional available information about the 3D object may be determined and used to refine or narrow down the set of candidate models. By way of particular example in which the 3D object is an automotive part, geographical data may be used to determine vehicle models sold in a particular geographical area. As another example in which the 3D object is a stereo control knob, the purchase history of the user may be used to determine the particular model of the stereo for which the knob is to be used.

In other examples, a user may be prompted to provide the additional data. For instance, a user may be prompted to provide data such as the manufacturer of the 3D object 112, a specific model number of the 3D object 112, etc.

At block 408, a determination may be made as to whether one of the models in the second set of candidate models matches the 3D object 112. For instance, the hardware processor(s) 210 and/or core(s) may determine that a matching model has been found at block 408 if the second set of candidate models includes a single model. Alternatively, in instances in which the second set of candidate models includes a relatively small number of candidate models, for instance, less than about 10 candidate models, the hardware processor(s) 210 and/or core(s) may output the second set of candidate models to a user and the user may select one of the candidate models as matching the 3D object 112. Thus, for instance, the hardware processor(s) 210 and/or core(s) may determine that a matching model has been found at block 408 based upon the user selection of one of the candidate models.

In response to a determination that a matching model has been found, the hardware processor(s) 210 and/or core(s) may store the matching model in the data store 212 and/or may output an instruction to print a replicated 3D object 122 using the matching model, as indicated at block 410. According to an example, the matching model may be stored in the data store 212 to enable a user to make modifications to the matching model. In another example, the hardware processor(s) 210 and/or core(s) may generate a descriptive data file from the matching model and may control the 3D printer 120 to print the replicated 3D object 122 using the generated descriptive data file. Otherwise, the hardware processor(s) 210 and/or core(s) may output an instruction to a user regarding the matching model. As discussed above, the matching model may be a high resolution digital model of the 3D object 112 and thus, the generated descriptive data file may allow for a higher resolution model of the 3D object 112 than may be possible from a descriptive data file generated from a complete scanning of the 3D object 112.

In response to a determination that a matching model has not been found at block 408, another area of the 3D object 112 that is to be scanned may be identified, as indicated at block 412. Block 412 may be similar to block 310 in FIG. 3. Additionally, the hardware processor(s) 210 and/or core(s) may output an instruction to scan the another area at block 414, which may be similar to block 312 in FIG. 3.

The hardware processor 210 may further repeat blocks 404-408 and 412-414 until a matching model is found at block 408, at which block 410 may be implemented and the method 400 may end.

Some or all of the operations set forth in the methods 300 and 400 may be contained as utilities, programs, or subprograms, in any desired computer accessible medium. In addition, the methods 300 and 400 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include computer system RAM, ROM, EPROM, EEPROM, and magnetic or optical disks or tapes. It is therefore to be understood that any electronic device capable of executing the above-described functions may perform those functions enumerated above.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. An apparatus comprising:
  a hardware processor;
  a machine readable storage medium on which is stored machine readable instructions that are to cause the hardware processor to:
    access a first scanned image, wherein the first scanned image corresponds to a scanned first feature of a three-dimensional (3D) object;
    perform a search for models matching the 3D object based upon the first scanned image;
    identify, from the search, a first set of candidate models;
    identify, from the first set of candidate models, a general identity of the 3D object;

determine, based upon the identified general identity of the 3D object, a second feature of the 3D object that is to be scanned;
output an instruction to obtain a second scanned image of the determined second feature of the 3D object;
access the second scanned image;
refine the first set of candidate models to a second set of candidate models based upon the accessed second scanned image; and
output the second set of candidate models.

2. The apparatus according to claim 1, wherein to determine the second feature of the 3D object that is to be scanned, the machine readable instructions are executable to cause the hardware processor to determine the second feature of the 3D object as a feature of the 3D object from which more accurate identification of a model matching the 3D object is to be made.

3. The apparatus according to claim 2, wherein to determine the second feature of the 3D object, the machine readable instructions are executable to cause the hardware processor to access a database containing information that identifies which features of a plurality of 3D objects are more likely to result in accurate identifications of the plurality of 3D objects.

4. The apparatus according to claim 1, wherein the machine readable instructions are executable to cause the hardware processor to:
access additional information pertaining to the identified 3D object; and
refine the search for models based upon the accessed additional information.

5. The apparatus according to claim 1, wherein the machine readable instructions are executable to cause the hardware processor to:
receive a selection of one of the candidate models in the second set of candidate models as a model that matches the 3D object; and
store the selected candidate model as a matching model of the 3D object.

6. The apparatus according to claim 1, further comprising:
an image scanner to scan the first feature of the 3D object, wherein the machine readable instructions are executable to cause the hardware processor to access the first scanned image from the image scanner and to output the instruction to obtain the second scanned image to the image scanner.

7. The apparatus according to claim 1, further comprising:
a 3D printing device,
wherein the machine readable instructions are executable to cause the hardware processor to:
access a model of the second set of candidate models; and
implement the 3D printing device to print a replicated 3D object from the accessed model.

8. The apparatus according to claim 1, wherein the machine readable instructions are further to cause the hardware processor to:
output a model of the second set of candidate models.

9. A method comprising:
accessing, in a computing apparatus, a first scanned image, wherein the first scanned image corresponds to a scanned first area of a three-dimensional (3D) object;
searching, by the computing apparatus, for models that match the 3D object;
identifying, from the search, a first set of candidate models;
identifying, from the first set of candidate models, a general identity of the 3D object;
determining, from the identified general identity of the 3D object, a second area of the 3D object that is to be scanned;
outputting, by the computing apparatus, an instruction to obtain a second scanned image of the determined second area of the 3D object;
accessing the second scanned image;
refining the first set of candidate models to a second set of candidate models based upon the accessed second scanned image; and
outputting the second set of candidate models.

10. The method according to claim 9, wherein determining the second area further comprises determining the second area to be an area of the 3D object from which a more accurate identification of a model matching the 3D object is to be made.

11. The method according to claim 9, further comprising:
receiving a selection of a model from the second set of candidate models; and
outputting one of:
the selected model to a user; and
an instruction for a 3D printer to print a replicated 3D object using the selected model.

12. The method according to claim 9, determining the second area of the 3D object to be scanned comprises accessing a database containing information that identifies which features of a plurality of 3D objects are more likely to result in accurate identifications of the plurality of 3D objects.

13. A non-transitory machine readable storage medium on which is stored machine readable instructions that when executed by a processor, cause the processor to:
access a first scanned image, wherein the first scanned image corresponds to a scanned first feature of a three-dimensional (3D) object;
search for models that match the 3D object based upon the first scanned image;
identify, from the search, a first set of candidate models;
identify, from the first set of candidate models, a general identity of the 3D object;
determine, from the identified general identity of the 3D object, a second feature of the 3D object that is to be scanned;
output an instruction to obtain a second scanned image of the determined second feature of the 3D object;
access the second scanned image;
refine the first set of candidate models to a second set of candidate models based upon the accessed second scanned image;
output the second set of candidate models.

14. The non-transitory computer readable storage medium according to claim 13, wherein the machine readable instructions are executable to cause the processor to:
receive a selection of a model from the second set of candidate models; and
control a 3D printer to print a replicated 3D object using the selected model.

15. The non-transitory computer readable storage medium according to claim 13, wherein to determine the second feature of the 3D object that is to be scanned, the machine readable instructions are executable to cause the processor to:
determine the second feature of the 3D object as a feature of the 3D object from which a more accurate identification of a model matching the 3D object is to be made.

16. The non-transitory computer readable storage medium according to claim 13, wherein to determine the second feature of the 3D object, the machine readable instructions are executable to cause the processor to access a database containing information that identifies which features of a plurality of 3D objects are more likely to result in accurate identifications of the plurality of 3D objects.

\* \* \* \* \*